US006457017B2

(12) United States Patent
Watkins et al.

(10) Patent No.: US 6,457,017 B2
(45) Date of Patent: *Sep. 24, 2002

(54) COMPUTING SYSTEM FOR INFORMATION MANAGEMENT

(75) Inventors: Richard M. Watkins; Henry C. Watkins, both of Acton; David V. Watkins, Wayland, all of MA (US)

(73) Assignee: Softscape, Inc., Acton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/857,576

(22) Filed: May 16, 1997

Related U.S. Application Data

(60) Provisional application No. 60/017,450, filed on May 17, 1996.

(51) Int. Cl.⁷ .............................................. G06F 17/30
(52) U.S. Cl. ...................... 707/103 R; 707/3; 707/100; 707/500
(58) Field of Search ............................ 707/103, 1, 101, 707/100, 8, 500–513, 103 R, 3; 345/433, 418

(56) References Cited

U.S. PATENT DOCUMENTS

| | | | | | |
|---|---|---|---|---|---|
| 5,519,865 A | * | 5/1996 | Kondo et al. | ................... | 707/1 |
| 5,544,360 A | * | 8/1996 | Lewak et al. | ................... | 707/1 |
| 5,560,005 A | | 9/1996 | Hoover et al. | ............... | 395/600 |
| 5,566,333 A | * | 10/1996 | Olson et al. | ................. | 707/103 |
| 5,568,639 A | * | 10/1996 | Wilcox et al. | .............. | 345/803 |
| 5,615,367 A | * | 3/1997 | Bennett et al. | ............. | 707/102 |
| 5,617,568 A | * | 4/1997 | Ault et al. | .................... | 707/101 |
| 5,630,125 A | * | 5/1997 | Zelweger | ..................... | 707/103 |
| 5,657,433 A | * | 8/1997 | Murase et al. | .............. | 345/433 |
| 5,680,619 A | * | 10/1997 | Gudmundson et al. | ........ | 707/8 |
| 5,682,497 A | * | 10/1997 | Robinson | ..................... | 507/711 |
| 5,717,924 A | * | 2/1998 | Kawai | ........................ | 707/103 |
| 5,724,575 A | * | 3/1998 | Hoover et al. | ......... | 707/103 |
| 5,742,813 A | * | 4/1998 | Kavanagh et al. | .......... | 395/616 |
| 5,813,009 A | * | 9/1998 | Johnson et al. | ............. | 707/100 |
| 5,819,275 A | * | 10/1998 | Badger et al. | .............. | 707/100 |
| 5,822,580 A | * | 10/1998 | Leung | | |
| 5,832,498 A | * | 11/1998 | Exertier | ...................... | 707/103 |
| 5,838,965 A | * | 11/1998 | Kavanagh et al. | .......... | 707/103 |
| 5,893,108 A | * | 4/1999 | Srinivasan et al. | ......... | 707/103 |
| 5,899,998 A | * | 5/1999 | McGauley et al. | ......... | 707/104 |
| 5,926,816 A | * | 7/1999 | Bauer et al. | ................... | 707/8 |
| 5,926,818 A | * | 7/1999 | Malloy | ........................ | 707/100 |
| 6,092,090 A | * | 7/2000 | Payne et al. | ................ | 707/530 |
| 6,243,724 B1 | * | 6/2001 | Mander et al. | ............. | 707/526 |

* cited by examiner

*Primary Examiner*—Vincent Millin
*Assistant Examiner*—Ella Colbert
(74) *Attorney, Agent, or Firm*—Lucash, Gesmer & Updegrove, LLP

(57) ABSTRACT

An information management system includes an indexing subsystem and a document management subsystem. The system layers an object-oriented architecture over a relational database to manage folders and files from a variety of file systems. Managed files are incrementally indexed by the indexing subsystem and can be retrieved by a user by knowing content of a managed file. Folders and documents are also logically organized for presentation to the user.

1 Claim, 16 Drawing Sheets

| CHECKOUT | CDI Ver Num | 635-1 |
|---|---|---|
| | CDI Foreign ID | 635-2 |
| | CDI Foreign Ver Num | 635-3 |
| | CDI Foreign Obj Type | 635-4 |
| | CDI Foreign Obj Sub Type | 635-5 |
| | SEP Foreign Ver Num | 635-6 |
| | Checked Out Usr ID | 635-7 |
| | Library | 635-8 |
| | System Flg | 635-9 |
| | Checked Out DT | 635-10 |
| | Checked Out Type | 635-11 |
| | Checked Out Flg | 635-12 |
| | Library Path 1 | 635-13 |
| | Library Path 2 | 635-14 |
| | Library Path 3 | 635-15 |
| | Origin Type | 635-16 |
| | Email Origin | 635-17 |
| | Http Origin | 635-18 |
| | Data File | 635-19 |

FIG. 12

| 650 | OLD_CDI_METADATA | CDI Obj ID | 655-1 |
|---|---|---|---|
| | | CDI Ver Num | 655-2 |
| | | CDI Obj Type | 655-3 |
| | | CDI Obj Sub Type | 655-4 |
| | | Checked Out Flg | 655-5 |
| | | Checked Out Type | 655-6 |
| | | Checked Out Usr ID | 655-7 |
| | | Creation DT | 655-8 |
| | | Created by Usr ID | 655-9 |
| | | Author | 655-10 |
| | | CDI Obj Name | 655-11 |
| | | Deleted Flg | 655-12 |
| | | m0 | 655-13 |
| | | ... | |
| | | mZ | 655-z |

FIG. 14

| 640 | CURRENT_CDI_METADATA | CDI Obj ID | 645-1 |
|---|---|---|---|
| | | CDI Ver Num | 645-2 |
| | | CDI Obj Type | 645-3 |
| | | CDI Obj Sub Type | 645-4 |
| | | Checked Out Flg | 645-5 |
| | | Checked Out Type | 645-6 |
| | | Checked Out Usr ID | 645-7 |
| | | Creation DT | 645-8 |
| | | Created by Usr ID | 645-9 |
| | | Author | 645-10 |
| | | CDI Obj Name | 645-11 |
| | | Deleted Flg | 645-12 |
| | | m0 | 645-13 |
| | | ... | |
| | | mZ | 645-z |

| METADATA_TO_COL NAMES | CDI Obj Type | 665-1 |
| --- | --- | --- |
| | CDI Obj Sub Type | 665-2 |
| | CDI Meta Col Name | 665-3 |
| | Usr Change Flg | 665-4 |
| | Col Desc | 665-5 |
| | Col Type | 665-6 |
| | Mandatory Flg | 665-7 |
| | Usr View Flg | 665-8 |
| | System Flg | 665-9 |

| Obj_Type | Obj Type | 675-1 |
| --- | --- | --- |
| | Obj Sub Type | 675-2 |
| | Obj Description | 675-3 |
| | Template File Flg | 675-4 |
| | Template File Name | 675-5 |
| | Icon | 675-6 |
| | System Flg | 675-7 |

FIG. 16

COMPUTING SYSTEM FOR INFORMATION MANAGEMENT

RELATED APPLICATIONS

This application claims priority to U.S. Provisional Application No. 60/017,450 filed May 17, 1996, the contents of which are incorporated herein by reference in their entirety.

BACKGROUND OF THE INVENTION

In a typical computer, a file system manages data stored on a disk. The data is logically stored in files, which are linked lists of physical data records on the disk. Files, in turn, are logically stored in a hierarchical directory or folder structure. A file allocation table is used by the computer to manage the relationship between these logical constructs and the physical records stored on the disk.

Typically, for a user to access a file, the user must know the name of the file and which folder the file is stored in. File names, however, are often cryptic or otherwise not easily remembered. For that reason, search engines exist to facilitate locating a file containing a specified search string. These search engines typically perform a file-by-file search of the file system. Such a brute force method of locating a file can take a considerable amount of time if the file system is large.

Once a file is found, the correct application must be launched to view the file contents. The viewing application is typically dependent on the file extension being associated with a compatible application at the time of file creation. This association is typically a one-to-one relationship where all files of a particular file extension are associated with one specific application.

SUMMARY OF THE INVENTION

In accordance with a preferred embodiment of the invention, a personal desktop information management tool combines with advanced information search and retrieval with object-based file management. A preferred embodiment of the invention also provides universal viewing of any file without the application that created that file. In addition, a preferred embodiment of the invention provides indexed searching. A relational database stores additional information about the files.

In accordance with the preferred embodiment of the invention, a computing system manages a plurality of files from a file system. The computing system includes a database for storing attributes of the managed files and an object-oriented manager coupled to the database. The manager preferably affects changes to a managed file by modifying the stored attributes in the database. The database is preferably a relational database.

The manager preferably includes a plurality of instantiated base objects. The relationships between the base objects are defined by information stored in the database. Preferably, the base objects represent a subsection of a plurality of files.

In the computing system, a manager preferably supports recursive processing. The stored attributes can include an ordered sequence between a plurality of sibling files. The computing system can further comprise an indexer for maintaining an index of all managed files and a general purpose file viewer for displaying content of a file created by an external complication.

The above and other features of the invention, including various novel details of construction and combination of parts will now be more particularly described with the reference to the accompanying drawings and pointed out in the claims. It will be understood that the particular computing system for information management embodying the invention is shown by way of illustration only and not as a limitation of the invention. The principles and features of this invention may be embodied in varied and numerous embodiments without departing from the scope of the invention.

BRIEF DESCRIPTION OF THE DRAWING

FIG. 12 is a schematic diagram of a preferred check out database table in accordance with the invention.

FIG. 13 is a schematic diagram of a preferred current metadata database table in accordance with the invention.

FIG. 14 is a schematic diagram of a preferred database table for old metadata in accordance with the invention.

FIG. 15 is a schematic diagram of a preferred database table for mapping metadata to column names.

FIG. 16 is a schematic diagram of a preferred object type database table in accordance with the invention.

DETAILED DESCRIPTION OF PREFERRED EMBODIMENTS OF THE INVENTION

Figure 1:
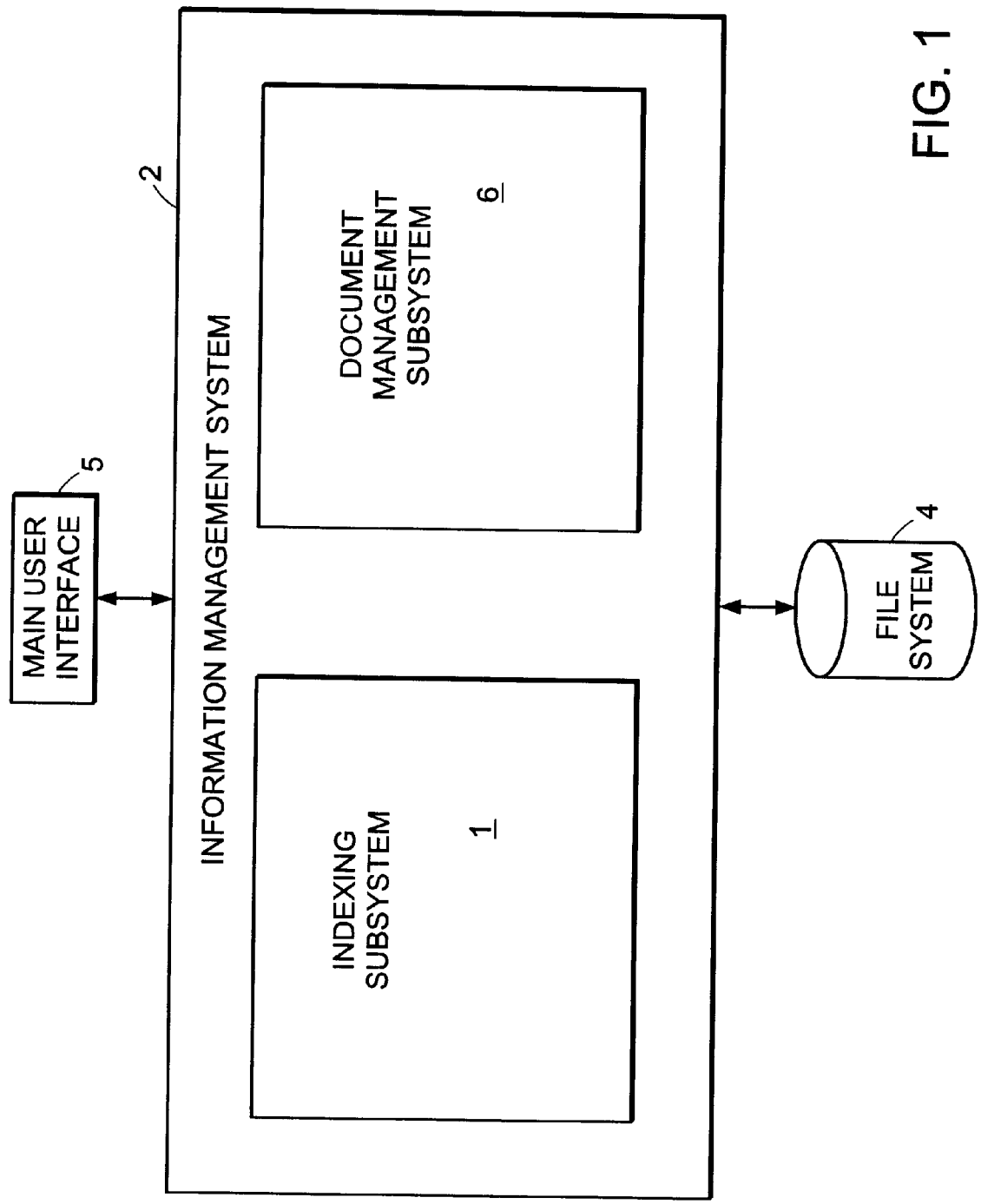
FIG. 1 is a schematic block diagram of a preferred computing system for information management embodying the invention.

FIG. 1 is a schematic block diagram of a preferred computing system for information management embodying the invention. An information management system 2 interfaces with a file system 4 and a main user interface 5. The file system 4 can be a local file system on a user's local disk, or a remote file system on a local area network (LAN), intranet or internet source. The information management system 2 includes an indexing subsystem 1 and a document management subsystem 6.

In a preferred embodiment of the invention, the information management system 2 is a software program executing on a desktop or laptop personal computer, server computer, or other suitable computing platforms. The information management system 2 is preferably embedded in a computer-readable medium, such as a CD-ROM, diskette, hard disk, or another distribution medium. A particular preferred embodiment of the invention is commercially available as Softscape Explorer Plus, Version 1.02, from Softscape Incorporation of Acton, Mass.

INDEXING SUBSYSTEM

For the information management system 2 to work efficiently, the indexing subsystem 1 maintains an index list of all managed files, directories and sites. The indexing subsystem 1 preferably performs incremental updates to the index list to increase the system response time to new or modified data.

Figure 2:
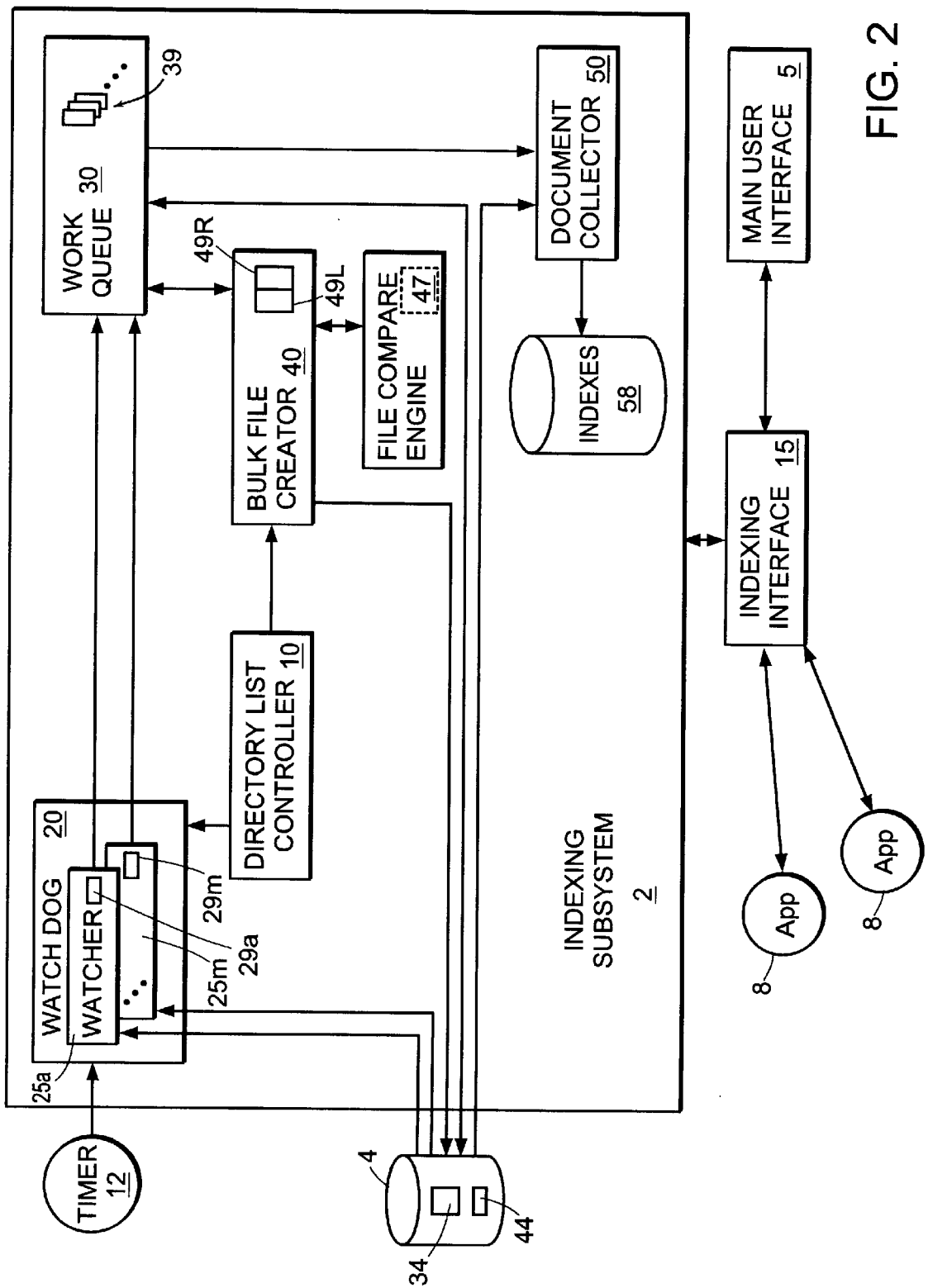
FIG. 2 is a schematic block diagram of a preferred indexing subsystem of FIG. 1.

FIG. 2 is a schematic block diagram of a preferred indexing subsystem 1 of FIG. 1. As illustrated, the indexing subsystem 1 includes an indexing interface 15 for receiving commands from the main user interface 5 and from external application programs 8. The indexing subsystem 1 includes a programmable timer 12, a directory list controller 10, a watchdog 20, a work queue 30, a bulk file creator 40 having an associated file compare engine 47, a document collector 50 and an index database 58. These various functions communicate with each other and the file system 4 as illustrated. Each architectural component is preferably implemented as a global object that persistently exist while the subsystem is running.

The directory list controller 10 is an object that manages a list of folders, drives, sites, and files that require indexing. The watchdog 20 is responsible for determining when files have been renamed, moved, modified, deleted, or created. For each of the items managed by the directory list controller 10, the watchdog 20 is notified of changes immediately as they occur, or after a user-defined scheduled time period provided by the timer 12.

The directory list controller 10 ensures that no two threads access the directory list at the same time, and that the index list does not have two directories that overlap. The directory list controller 10 uses a binary data file to store the information it needs to build an in-memory linked list of places that are indexed. The information managed and maintained by the directory list controller 10 is used by the watchdog 20 to know which directories or sites need to be watched.

Specifically, the watchdog object 20 sets up a plurality of watcher threads 25a, . . . ,25m based on the information in the directory list. For example, one of the nodes of the list represents a file system on the network n: drive that is being monitored continuously, and that was last indexed yesterday at 2:00. Another node may represent a File Transfer Protocol (FTP) site that is checked every 45 minutes for changes and updates. For each location (e.g., directory or site), a respective thread 25 is established with location-specific execution requirements.

Figure 3:
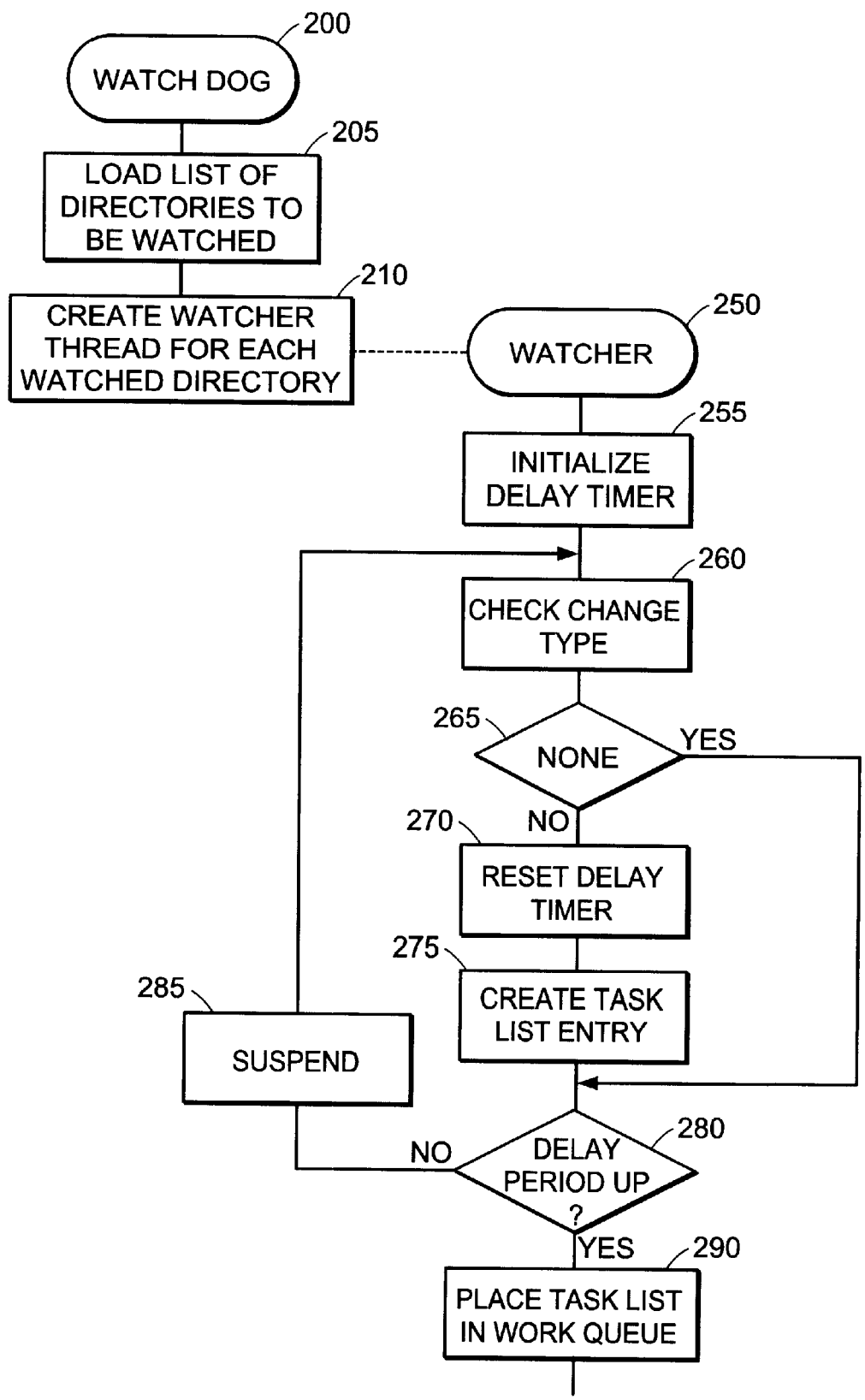
FIG. 3 is a flowchart of the watchdog object of FIG. 2.

FIG. 3 is a flowchart of a preferred watchdog object 20 of FIG. 2. At step 205, the watchdog loads a list of directories to be watched from the directory list controller 14. At step 210, the watchdog 20 creates a watcher thread 25 for each watched directory.

At step 250, a watcher thread 25 is activated by a trigger, such as a change in the watched directory or a periodic timer. When the thread 25 is triggered, it will wake up to process the watched directory. At step 255, a delay timer is initialized. At step 260, the type of change to the directory is determined. At step 265, if there has been a change then the delay timer is reset at step 270 and a thread-local task list entry 29 (FIG. 2) is created at step 275. If there has been no change at step 265, processing jumps to step 280.

At step 280, the watcher thread 25 determines whether a preselected delay period of preferably two seconds has been completed. If not, then processing is suspended until a wake up is received at step 285. After the wake-up, processing continues to step 260 to complete a processing loop. This processing loop allows the watcher thread 25 to recognize when the file system has not changed for a specific period of time. Once it is determined that the file system is unchanged, processing continues to step 290 where the object creates a work task to be placed on the work queue.

In summary, when the watcher thread 25 recognizes that something has changed, a task is entered into the work queue 30 at step 290. When the bulk file creator 40 writes bulk files, it pulls tasks from the work queue 30. During this time, the watcher thread 25 stops waiting and restarts.

The watchdog class 20 thus manages scheduled directory checks using a windows timer 12 and watcher threads 25 to perform processing at specific time periods. When indexing is required, a work task is added to the work queue 30 and the bulk file creator 40 is notified to check the work queue.

Returning to FIG. 2, the work queue 30 is a persistent queue for managing work task 39. This component class is capable of managing an infinite number of types of work tasks. When the watchdog 20 determines that a subset of files in the file system 4 needs to be reindexed, it places a work task on the work queue 30 for the bulk file creator 40 to process. Other objects in the system can also query the queue 30 for work. If the queue 30 includes a work request that the calling class can process it will pass the task to the calling class so the task can be removed from the queue. The work queue 30 is fault tolerant, such that if the system fails tasks in the queue are not lost and can be processed when the system returns on-line.

Figure 4:
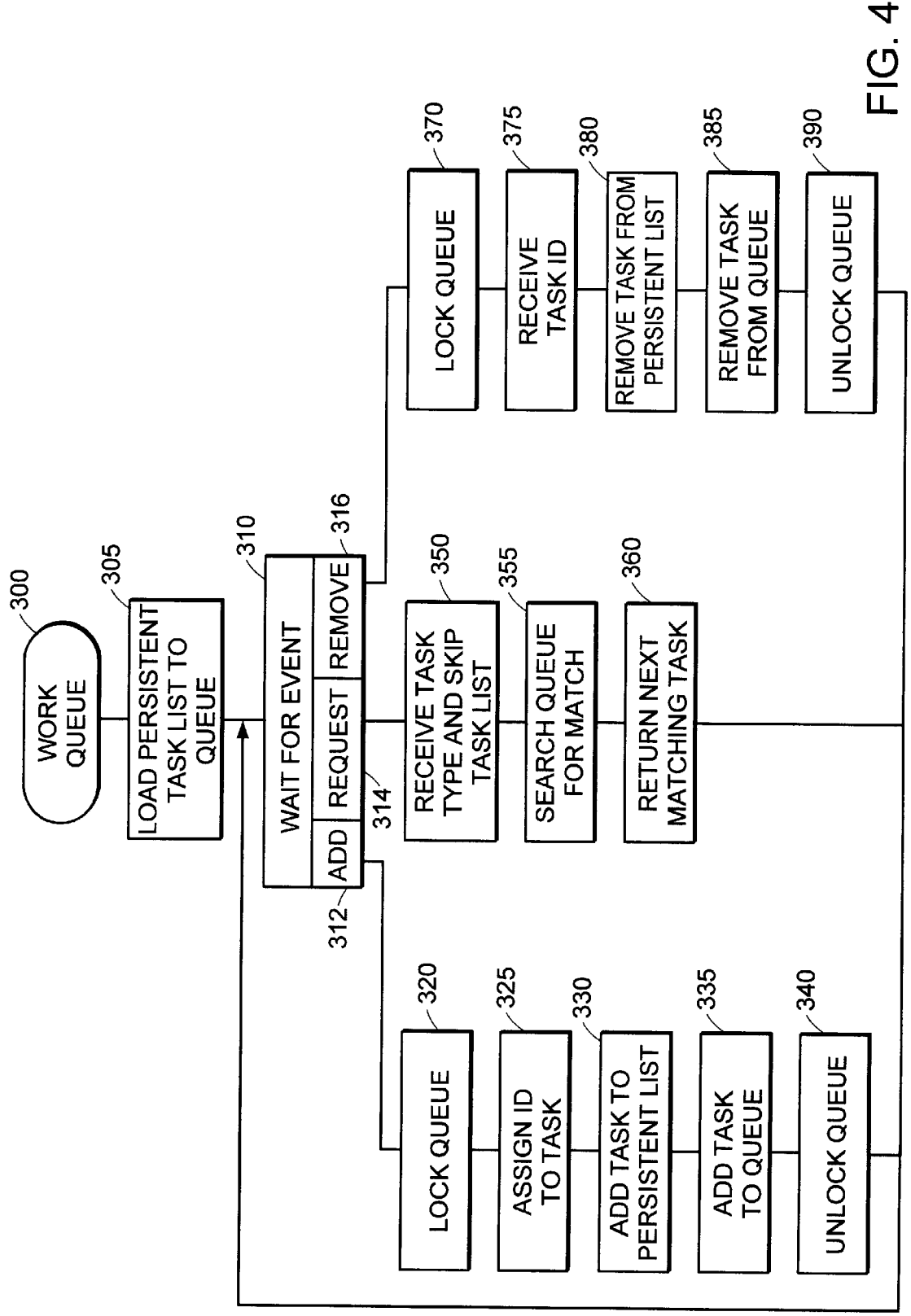
FIG. 4 is a flowchart of a preferred work queue object of FIG. 2.

FIG. 4 is a flowchart of a preferred work queue object 30 of FIG. 2. The work queue object 30 maintains records of work to be processed, and the type of task work. This global object is called by the watchdog 20, bulk file creator 40, and the document collector 50 to add work tasks and remove work tasks. It maintains any number of types of work tasks—tasks for the bulk file creator 40 and task for the document collector 50. The work tasks maintained are extensible, such that future components leverage the work queue to manage tasks that need to be processed. The work queue object 30 uses file system files 34 for each of the tasks so that after a system shut down, this task list 34 is maintained and persistent. Other classes in the system query the work queue to see if there is any work available in it, or to take a process task off the queue.

At step 305, a persistent task list 34 is loaded into a thread-safe linked list (task queue) 39 in memory. At step 310, the work queue waits for an event to trigger a response, which can be an add 312, a request for work 314, or a remove event 316.

In the case of an add event 312, processing jumps to step 320 where the work queue is locked. At step 325, an identifier is assigned to the task to be added. At step 330, the task is added to the persistent list 34. At step 335, the task is added to the in-memory linked list 39. At step 340, the queue is unlocked. Processing then returns to step 310 to wait for the next event.

In the case of a request for work 314, processing jumps to step 350 where the work queue object 30 receives from a requestor a requested task type and any tasks to be skipped. At step 355, the linked list 39 is searched for a task which meets the requested criteria. At step 360, the next task matching the requested criteria from the linked list 39 is returned to the requestor. Processing then returns to step 310 to wait for the next event.

In the case of a remove event 316, processing jumps to step 370 where the work queue is locked. At step 375, a task identifier is received from the requestor. At step 380, the task having the requested task identifier is removed from the persistent list 34. At step 385, the task is also removed from the in-memory linked list 39. At step 390, the queue is unlocked. Processing then returns to step 310 to wait for the next event.

Returning to FIG. 2, the bulk file creator 40 processes tasks by creating a bulk file 44. A bulk file 44 is a tagged text file used by the document collector 50 to determine which files to delete, add or update in the indexes 58. The bulk files 44 are also used to provide for fault tolerant processing—if the system fails, the bulk files are still available from disk 4 to resume indexing at the point during the file processing where the crash occurred.

The file compare engine 47 is used by the bulk file creator 40 to determine what files have been added, removed, or changed. This engine determines the difference between two ASCII files (a left-side file 49L, and a right-side file 49R) by comparing them line-by-line. Using a callback function, the bulk file creator 40 is notified regarding the lines that are the same in both files, and the lines that only exist in only one of the files. The input files used are preferably encrypted directory lists of all the files in a particular file system directory or site.

Figure 5:
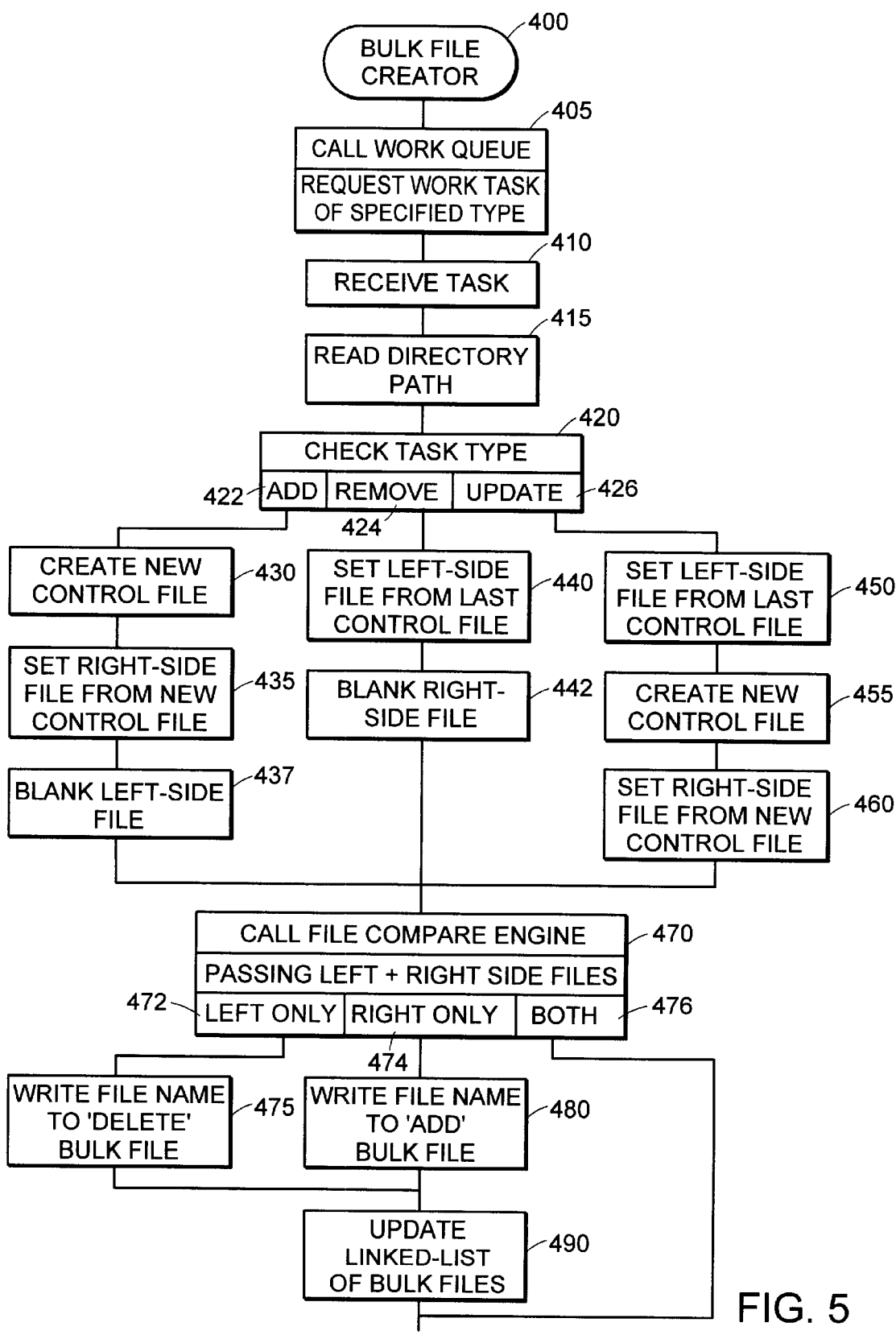
FIG. 5 is a flowchart of a preferred bulk file creator object of FIG. 2.

FIG. 5 is a flowchart of a preferred bulk file creator object 40 of FIG. 2. The bulk file creator 40 is a class which comprises a part of the infrastructure that allows incremental indexing by indexing only files that have been added or removed. This provides for an efficient method of file indexing, as opposed to indexing an entire directory. For example, if there were 10,000 files in an index, and one is deleted or added, only the incremental changes are applied to that one file—rather than having to rebuild the entire index.

The bulk file creator 40 receives notification of work tasks from the work queue 30 at step 405. This notification indicates that a directory requires indexing and the type of directory (e.g., FTP, e-mail, network, file system). At step 410, the bulk file creator 40 receives a work task. At step 415, the work task is checked for a directory path. At step 420, the task type is checked. The task type can either be to add a directory 422, remove a directory 424, or update a directory 426.

Briefly, a control file is created as an encrypted list of all the files and their last modification dates in the directory and subdirectories. This new control file is compared with an old control file using the file compare engine 47. The result of the comparison is used to create a bulk file 44.

In the case of an add directory task 422, processing continues to step 430 where a new control file is created. At step 435, the new control file is copied to the right-side file 49R. At step 437, the left-side file 49L is blanked. Processing then continues to step 470.

In the case of a remove directory task 424, processing continues to step 440. At step 440, the last created control file is copied to the left-side file 49L. At step 442, the right-side file 49R is blanked. Processing then continues to step 470.

In the case of an update directory task 426, processing continues to step 450. At step 450, the current control file is copied to the left-side file 49L. At step 455, a new control file is created. At step 460, the new control file is copied to the right-side file 49R. Processing then continues to step 470.

At step 470, the file compare engine 47 is called to compare the left-side file 49L and the right-side file 49R line-by-line. The file compare engine 47 is preferably a call back function of the bulk file creator 40. When the bulk file creator 40 processes a file comparison, it calls a function in the file compare engine 47 and passes a pointer to this call back. The call back is called once for every file that the file compare engine 47 determines has been deleted, modified or added.

The file compare engine 47 is preferably implemented as a dynamic link library (DLL) with an export method. This class is passed the names of the two files to compare and a call back function to call for each line of the files analyzed.

There are three possible outcomes from the comparison for each line. One possibility 472 is that there has been a deletion so the line exists only in the left-side file 49L. Another possibility 474 is that there has been an addition so the line exists only in the right-side file 49R. The final possibility 476 is that there has been no change so the line exists in both files. Note that a modified file will have different modification dates in the two files. Consequently, a modify is viewed as a file deletion and a file addition.

If the line exists only in the left-side file 49L (condition 472), then a file which previously existed has been deleted from or modified in the watched directory. The file name is written to a "delete" bulk file at step 475 and processing continues to step 490. If the line exists only in the right-side file 49R (condition 474), then a file now exists which did not previously exist in the directory. The file name is written to an "add" bulk file at step 480 and processing also continues to step 490. If a line exists in both files (condition 476), then there has been no change to the file and processing returns to step 405.

At step 490, the linked list of bulk files 44 is updated for the document collector object 50. Processing then returns to step 405.

Thus, for each file to be added or deleted from the index, a record in a bulk file 44 is created. The bulk files are text files that preferably have 1 to 250 records listing files that need to be deleted or added. The bulk files 44 are stored on the file system 4 (e.g., hard drive) and used by the document collector object 50 to process the files that require indexing.

The bulk file creator 40 can also manage the creation of the bulk files for e-mail directories. Preferably, the bulk file creator 40 parses the e-mail text files and deciphers what file offsets include text that can be indexed. A single e-mail file can contain hundreds or thousands of messages and attachments appended to one another. This parsing function determines the beginning and end of a list of concatenated messages.

The bulk file creator 40 also preferably has to separate the bulk files for e-mail, PDF, and regular collections. This implies that there be six types of bulk files created: two for each collection ("add" file and "delete" file). The PDF task is accomplished based on the file extension. The e-mail task is accomplished based on a work order to process the directory. For e-mail, the system determines the type of e-mail in order to determine the proprietary file extensions and how to parse the files.

Returning to FIG. 2, the document collector 50 is responsible for managing the indexes 58 of the system. This includes any system generated indexes as well as indexes that are connected to the system (i.e., remote indexes). All file indexing, e-mail indexing, index maintenance, and filtering is performed by this class. The document collector 50 uses the bulk files 44 created by the bulk file creator 40 to determine which files need to be indexed, reindexed, deleted, etc.

Figure 6:
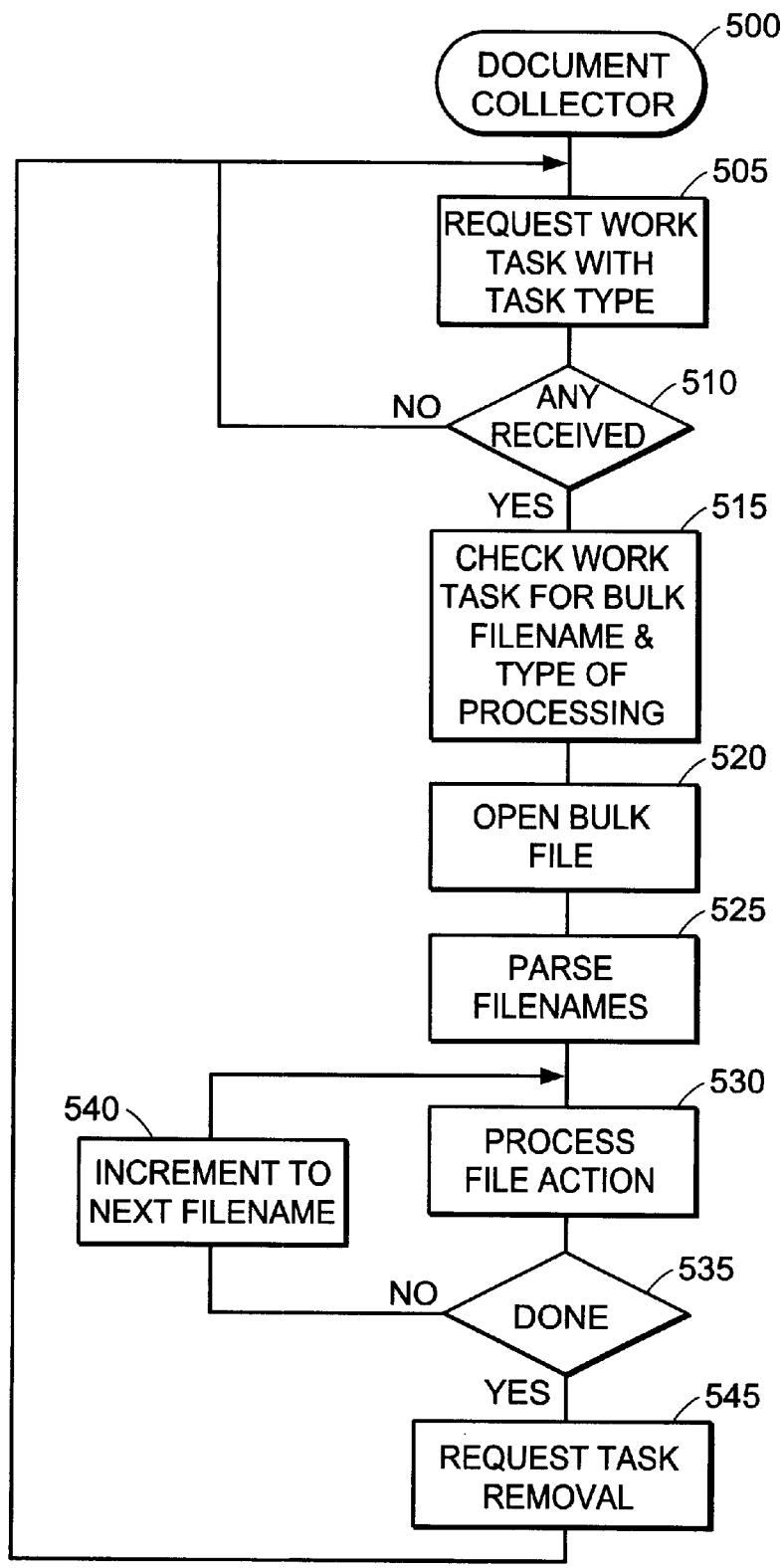
FIG. 6 is a flowchart of a preferred document collection object of FIG. 2.

FIG. 6 is a flowchart of a preferred document collector object 50 of FIG. 2. The document collector 50 is a class that manages the text indexes and file filtering. It maintains a list of these indexes and an index list serialized into a file.

At step 505, a request to the work queue 30 is made for a work task by specifying a task type. At step 510, a response is received from the work queue 30. If there are no work tasks to be processed, processing return to step 505, after a possible delay. If there is a work task to process, processing continues to step 515 where the work task is checked for bulk file names and the type of processing to perform. At step 520, the bulk file 44 is opened and file names are parsed at step 525.

A processing loop is entered at step 530, where the document collector 50 processes the file action. At step 535, if there are more files to process, the bulk file 44 is indexed to the next file name at step 540 and processing returns to step 530. Once the bulk file 44 has been processed, processing continues to step 545 where a request is sent to the work queue 30 to remove the task associated with the process bulk file. Processing then returns to step 505. On start up, the document collector 50 checks the work queue for work and connects to the enabled indexes, remote or managed. When the document collector 50 is idle, it may disconnect from the index to save system memory. Therefore, the document collector 50 has to keep track if it has a session to work with. It will then check for more work for itself. This object also maintains a list of remote indexes that it is connected to.

DOCUMENT MANAGEMENT SUBSYSTEM

Figure 7:
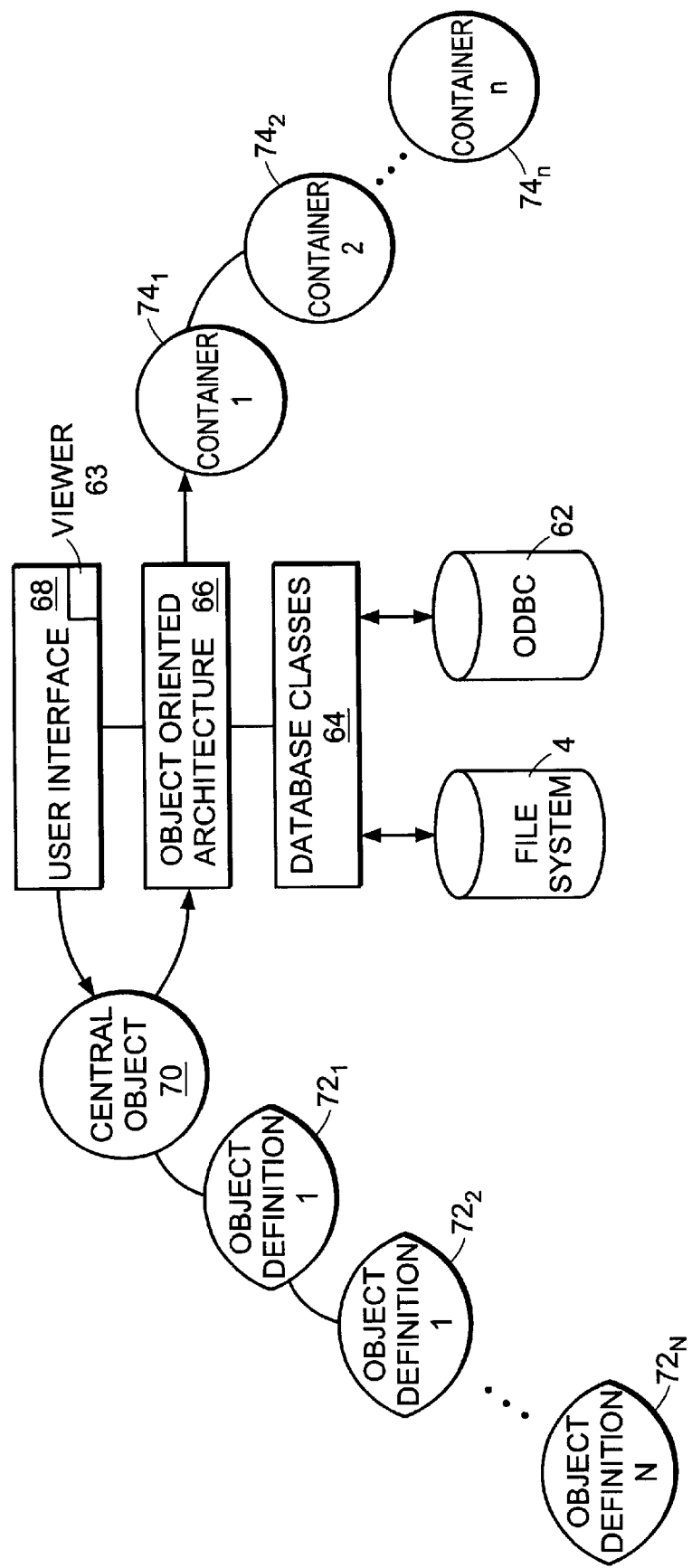
FIG. 7 is a schematic block diagram of a preferred document management subsystem of FIG. 1.

FIG. 7 is a schematic block diagram of a preferred document management subsystem 60 of FIG. 1. At the core of the subsystem is an object oriented file system 66 layered over an Open Database Connectivity (ODBC) database 62 which utilizes a full-text information retrieval engine. This file system provides text searching, attribute searching, custom object creation, configuration management and version control.

Managed files from the file system 4 are represented as relational database information in the ODBC database 62. Layered over the file system 4 in the ODBC database 62 are database classes 64. An object oriented architecture 66 is in turn layered over the database classes 64. A user interface 68 permits communication with the object oriented architecture 66 and includes a general-purpose viewer 63 for displaying textual content, which can be stored in various native formats, to the user. The object oriented architecture 66 defines a central object 70 which has a plurality of object definitions $72_1, \ldots, 72_n$. In addition, the object oriented architecture provides a linked list of containers $74_1, \ldots, 74_n$. The containers 74 are defined by the object definitions 72.

In accordance with one aspect of the invention, the containers 74 are Object Linking and Embedding (OLE) objects. A container 74 is the base class for all objects of the system. A system object can be a folder, a document or an external information type (i.e., Universal Resource Locator (URL), link, or external document manager object). The document management functions are preferably implemented using the container objects 74 and derived classes.

Figure 8:
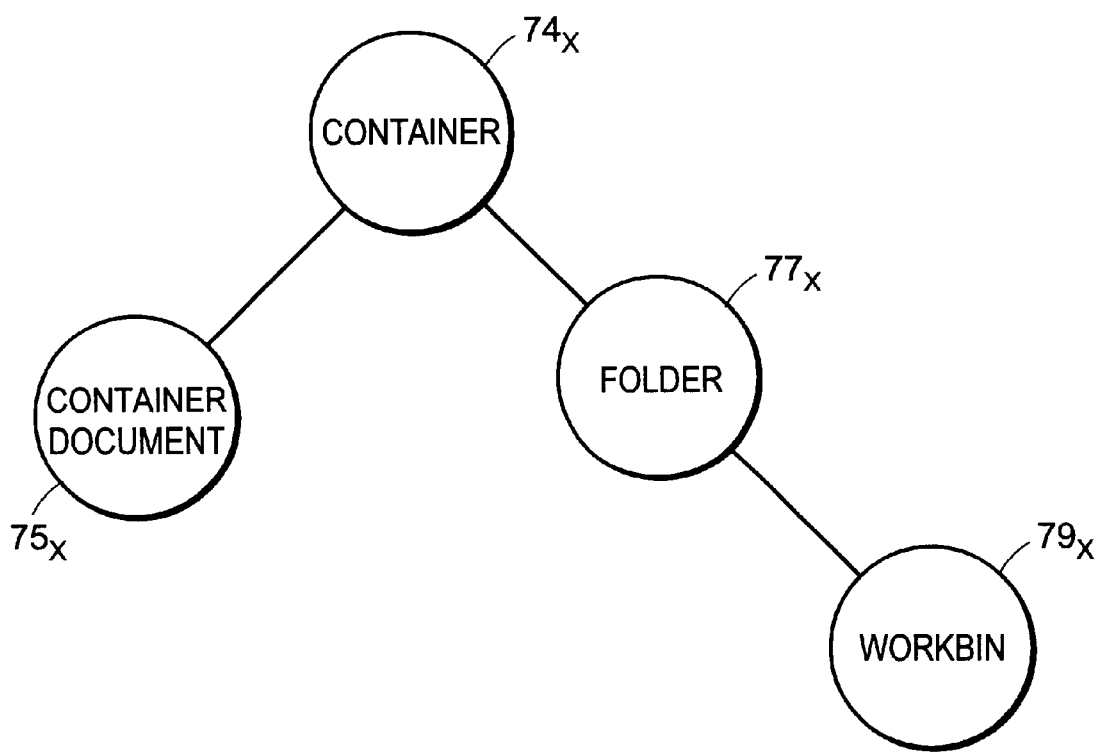
FIG. 8 is a schematic diagram of a preferred container of FIG. 7.

FIG. 8 is a schematic diagram of a preferred container of FIG. 7. The base container class $74_x$ preferably has three derived classes from it: a container document $75_x$, a folder $77_x$, and a workbin $79_x$.

A preferred object model of the system allows the document management objects (i.e., their container derivatives) to remain persistent. All relationships that the containers 74 have with one another in the system, as well as all the attribute and metadata information, are stored in the ODBC database 62. The database 62 is manipulated by the additional class architecture 64. Therefore, the container objects 74 themselves are separated from the database 62 by this layer of database class objects 64. Textual information is maintained in a full-text index database that works in parallel and in conjunction with the ODBC database 62.

Much of the document management functionality requires recursive processing. For example, when a new version is made for a parent folder, all of its child folders need to have their version attributes incremented (if they are changed). When the parent folder is checked out (described in detail below), all of its children and descendants are also required to be checked out. This functionality is provided by the container object containing a controlling function for checking-out children. This function relies on the virtual members of the container to traverse through the tree of objects and process each, as well as its children, accordingly. It is the responsibility of the derived classes to implement the functionality required by a check out, delete, versioning, etc.

The recursive methods of a container 74 allow entire hierarchies to be versioned, checked out, deleted, etc. This recursion is preferably implemented by making the object aware of not only its metadata, but of its parent-child relationship with other objects in the system. For example, when checking in a container, the container alters its metadata to make its state persistent, and then uses its relationship information to check in children.

During a program session, container objects 74 are instantiated only when needed, and discarded when not needed. Therefore, container objects 74 can be used to view repositories of any size, they are only instantiated when needed to view a particular piece of the repository. The user interface 6 for the system preferably includes five container objects 74, each used to provide a view of a subset of the repository. The on-demand instantiation of each container and its children allows viewing and navigating through large hierarchies of information. When needed, the database is accessed to get a block of child containers. Memory caching is also preferably used to ensure that too many containers do not request memory at the same time, and to maintain quick system response time.

DATABASE OBJECTS

Figure 9:
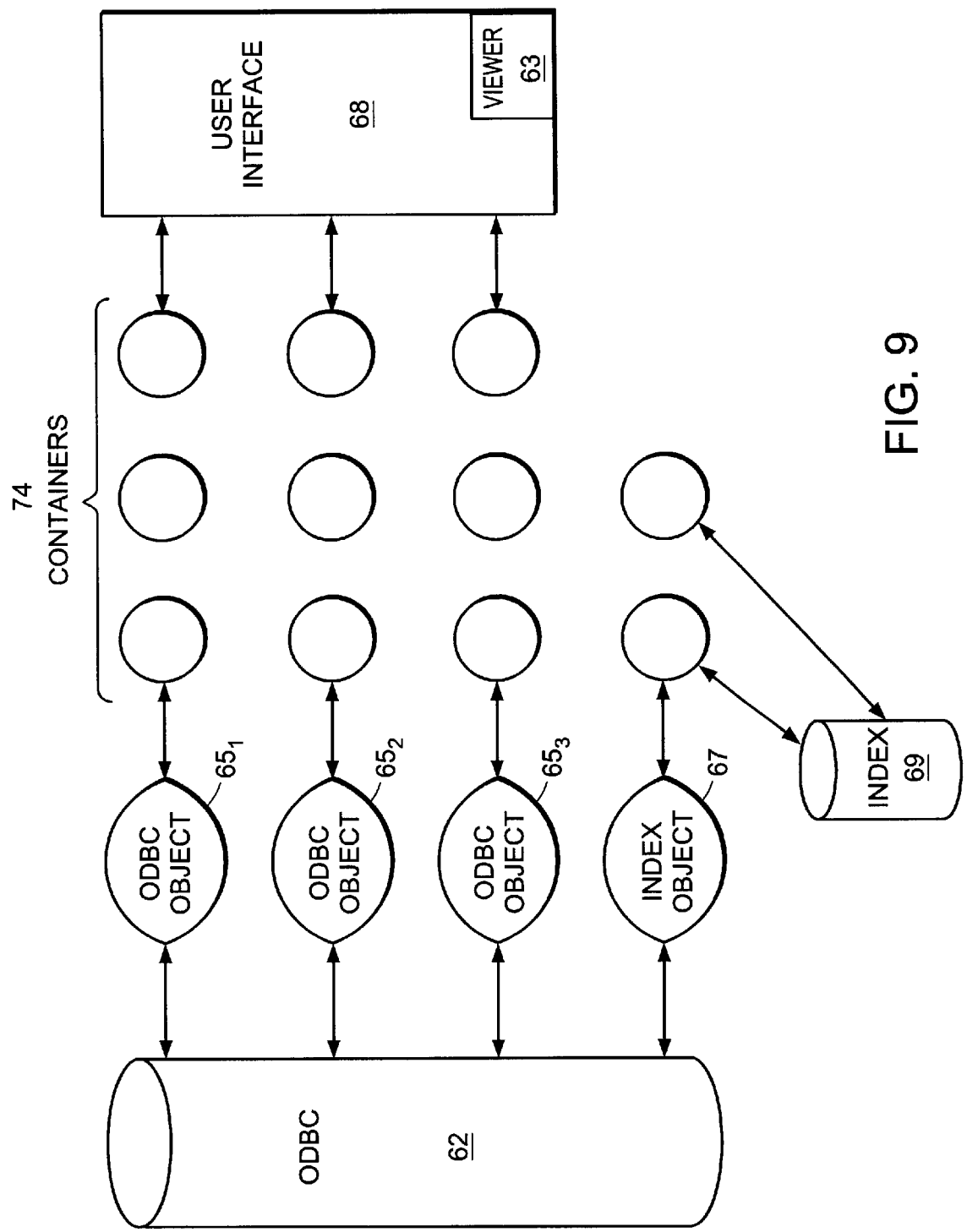
FIG. 9 is a schematic block diagram of an ODBC database objects and their interaction with containers.

FIG. 9 is a schematic block diagram of ODBC database objects and their interaction with containers. Container objects 74 are created as an instantiation of attributes (names, date created, type) and relationships (parent, child). This instantiation is done by ODBC objects $65_1, \ldots, 65_3$ which are queried for objects with certain metadata or relationships. The ODBC objects $65_1, \ldots, 65_3$, then in return, pass back container objects 74 matching the criteria. The layer of ODBC objects 65 with containers 74 on top of the relational database 62 turn the database 62 into an object repository. Each object in the system gets its attribute values (metadata) from a single row in a database table. The relationships for the object come from many rows from another database table.

The objects in the repository all share several common attributes including user ID, object ID, name, date created, date modified, and checked out user ID. In addition, each object can have custom attributes of type, for example, data, Boolean, decimal, or integer. These custom attributes are stored as raw data in the database and converted to the specified type at run-time by the system. This allows data definition altering and data modification without altering database structure. When the container object 74 needs to view an attribute, it converts the attribute to a human-readable form. When the data is saved back, the container 74 converts the data from the human-readable form back to the database data form. The database data form is also created such that a SQL query can be done on the data as if it were being stored in its native format.

When a container 74 makes itself persistent, it needs to store its relationship data and its metadata in a permanent storage, such as a database file. The container 74 also needs to keep track of its relationship and metadata information in memory as long as it is instantiated. Changes which occur to a container 74 in memory must be immediately reflected in the database to ensure data integrity. This is done by using the ODBC database objects 65 to write to a database and then by having the container objects synchronized their memory information.

DATABASE TABLES

Each object in the system has its own metadata or attributes and belongs to a user-defined and database-driven class. For example, there may be a class called a customer folder that has attributes which include: customer name, customer phone number, and last contact date. The metadata for all classes is stored as strings in two database tables—one for current objects and one for old versions. At run-time, the string values are mapped or converted to their display type. Although the data is stored in the database as a string, to the outside world, the data can be in an integer, date, Boolean, string, or decimal. The container classes manage the data mapping from the external view of the data to the internal storage string.

To manage, modify, add, and delete these class definitions, (e.g., the attribute list for a customer folder), other tables are used to store the class definition information. These tables are accessed by database objects (which are accessed by the container) in order to know how to display the metadata for a particular instance of a container 74.

For speed efficiency, the object metadata for the latest versions of containers is stored in one database table (FIG. 13), whereas the metadata for old versions of these objects are stored in a mirror image of the table (FIG. 14). These tables will be discussed in further detail below.

The attribute definitions are managed in linked lists by the central object 70 which manages the document management session. The containers 74 are responsible for maintaining their attribute values. In addition, object definitions are not loaded into memory from the database until an object of that type is instantiated. This allows the system to dynamically update metadata definitions on the fly without rebuilding the database or restarting the system. Therefore, one can add another attribute to the definition of, for example, a customer folder, without restarting or reorganizing the database.

One object definition object exists for each type of object in the system. Linked objects exist in a linked list on the central object 70. As definitions are altered, added or deleted, the in-memory object definitions are modified. The object definition information comes from tables in the ODBC database 62 (FIGS. 15 and 16). These tables will be discussed in further detail below.

A preferred object model allows multiple versions of a single document or folder (each a container), as well as multiple versions of hierarchies (i.e., configuration management). In addition, each version of a container 74 can have different values for its metadata. This is because, to uniquely identifying an object in this system, an object ID as well as a version number is required. Physically, for each object in the system, there is one record in one of the metadata tables.

The relationship information not only maintains the relationships between current objects, but also the relationship that old version of the object may have maintained with other objects in the system. From one version to a newer version, the configuration may change and the relationships between objects in the system may change. These changes are processed by the recursive container object and made persistent by the database ODBC objects 65.

As described above, the containers 74 in the system have relationships with other containers 74. The types of relationships preferably supported include parent-child with sequence. Therefore, the system can have a parent folder with ten child documents (or folders), in a specific order for the children. This relationship management is maintained in two database tables, one for the latest version objects (FIG. 10) and one for old objects (FIG. 11). For a given container 74, the information in these tables can tell who its parent(s) are, who its children are, what order its children exist, and what order it is among its own siblings.

CHECK OUT

A document or folder hierarchy can be checked out, meaning uncompressed and marked such that it will not be available to other users. The hierarchy is checked out to another container-derived type called a workbin 79. The workbin 79 is extended such that it can have children from the archive repository as well as the current repository. The workbin 79 is a view of information in the system; a child in a workbin 79 can also be the child of another container in the system, but when the relationship with the workbin object is severed, it only means the object is being viewed somewhere else—not that the object is now orphaned. Therefore, rather than present a sea of information (documents and folders) to the user, the user only sees what is currently being worked on (i.e., checked out), which in this case is a workbin.

When an item is checked out, moved or worked on, there are rules created to ensure data integrity. For example, allowing a situation for a parent object is suddenly made into a child of its child is legal from a relationship standpoint, but results in a recursive relationship between the objects in the system. To avoid this, and other potential data integrity violations, rules are instantiated. These rules are as follows:

Old versions and read-only versions of documents and folders cannot have their children moved or edited. In addition, they cannot be edited or moved from their parents either.

Objects are checked out only to workbins. The object can have children that subsequently get checked out as a result of the parent getting checked out. However, one object cannot be checked out from the repository as child of another object.

An object can be checked out without checking out its parents. If an object is checked out to a first user, and second user checks out the parent object, the second user will not be able to move or edit the child object which is checked out to the first user.

If an object is checked out without its parent, it becomes the direct descendent of a workbin. From here, it can only be moved to other workbins. If the system were to allow the object to be moved to be a child of another object, the original relationship it had with its non-checked out parent would be violated.

Objects, folders and documents can be moved, copied and linked to each other. If an object is linked or shadowed, it can exist as a child of many other objects, but only maintained in one place. If an object is a shadow (exists as a child of two or more objects), it cannot be shadowed with a workbin because the workbins are only views of information.

If a child is checked out without its parent, and then the parent is checked out by the same user, the system makes sure the child object ends up as a child, and not on the same level as the parent in the workbin. Specifically, the system renames the relationship the child has with the workbin before allowing the check out to continue.

When an item is checked out, all of its children also must be checked out.

When an item is checked in, it must be the direct descendent of a workbin. This makes the situation where a parent is checked out but its children are not an impossible situation. When the parent is checked in, all of its children are check in as well.

FULL-TEXT INDEX

Returning to FIG. 9, a full text index feature is preferably implemented using a full-index object 67 analogous to the database objects 65. Again, the container 74 is a layer between the user interface and a full-text index database 69. When a query is passed to the full-text index object 67, it passes back a link list of matching containers 74, which, in turn, gather the metadata in full text search capabilities.

Data about a particular container, in the case of a document, resides in both the ODBC database 62 and in the full-text index 69. The container 74 and the architecture synchronizes the information in both of these places. This allows a container 74 to be instantiated from data residing anywhere in the system. The container object provides a view of compiled information in many different sources (attribute database, relationship database, and full-text index). Via its properties and methods, the container object ensures that data sources from which it is instantiated are synchronized. For example, if an item is donated from one information source, the full text index needs to be aware.

In a preferred embodiment of the invention, any searching technology can be employed to facilitate full-text searching. One suitable search engine is Topic, versions 1.52 and 2.0, commercially available from Verity Incorporated. Another suitable search engine is CPL, version 6.1, commercially available from Personal Library Services. Custom engines can also be used.

USER INTERFACE

The main feature of the user interface 68 is the visual representation of workbin objects. These objects maintain relationships and properties as described above. Items can be checked out from the local repository as well as external repositories. Items checked out from other repositories maintain their information from the other repositories and can be checked back in.

The containers are displayed visually and in the same relationships as defined by their metadata and relationship data attributes. Folders have methods pertaining to handling children and to publishing methods that can be used directly by the user interface. Container documents have similar methods, but in addition have document manipulation methods, such as file format conversion to HyperText Markup Language (HTML) and compression.

In accordance with one aspect of the invention, containers can have both parent-child relationships and sequencing between children. For example, a document may include a plurality of ordered sections, such as chapters, each residing in a respective container. By sorting these chapter containers by a sequence number, the document structure is displayed to the user ordered by chapter instead of alphabetically.

In accordance with another preferred aspect of the invention, a general purpose viewer 63 is used to display file contents to the user. The viewer 63 includes filters for a plurality of file formats, such as word processors, spread sheets, databases, graphics and compression from various manufacturers. Although custom filters for the most common formats can be used, a preferred embodiment of the invention incorporates KeyView filters and viewers, commercially available from FTP Software, Inc.

DATABASE TABLES

Figure 10:
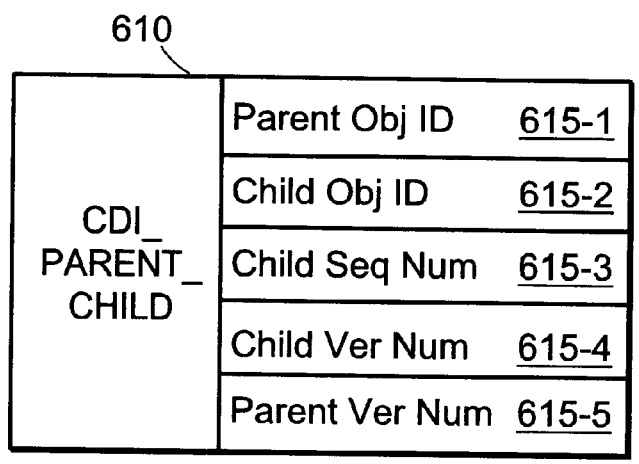
FIG. 10 is a schematic diagram of a preferred parent-child database table in accordance with the invention.
Figure 11:
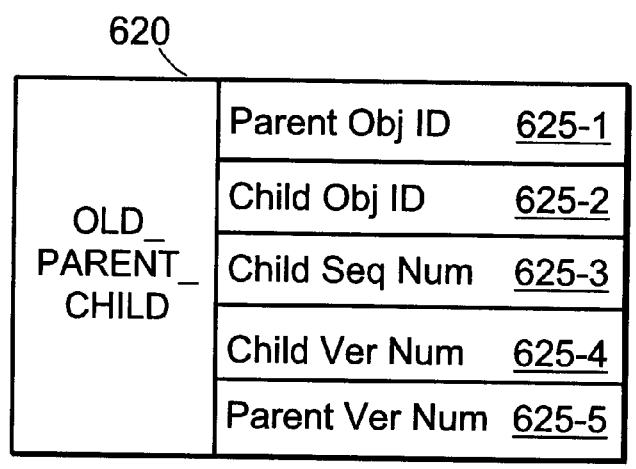
FIG. 11 is a schematic diagram of a preferred parent-child database table for old versions of objects in the system.

FIG. 10 is a schematic diagram of a preferred parent-child table in accordance with the invention. The CDI_PARENT_CHILD table 610 manages and maintains the relationships between the different objects in the system. Specifically, this table 610 manages the relationships for the most recent versions of objects. Information stored in this table 610 facilitates hierarchies of objects for the order that an object exists among its siblings is persistent.

As illustrated, the CDI_PARENT_CHILD table 610 include five attributes (i.e., columns) of data. A ParentObjID 615-1 identifies a unique identifier for a parent object. A ChildObjID 615-2 identifies a unique identifier for a child object. A ChildSeqNum 615-3 specifies the order that the child falls in among its siblings (1st, 2nd, 3rd, . . . , last). A ChildVerNum 6154 specifies a version number of the child object. Finally, a ParentVerNum 615-5 specifies a version number of the parent object.

FIG. 11 is a schematic diagram of a preferred parent-child database table for old versions of objects in the system. As illustrated, an OLD_PARENT_CHILD table 620 is analogous to the CDI_PARENT_CHILD table 610.

FIG. 12 is a schematic diagram of a preferred check out database table in accordance with the invention. The CHECKOUT table 630 manages which documents are checked out and how these documents are checked out in a multi-user environment. For each checked-out file in the system, the CHECKOUT table 630 records associated extended check out information. At a minimum, check out status and basic information can be stored with the objects metadata.

However, the CHECKOUT table 630 allows for extended types, such as types checked out from foreign systems (i.e., other document managers). In such a case, this record will list the names of the DLLs that are used to interact with the source for the checked out object. Each of the DLLs will have predefined functions exported in them that the information management subsystem can expect to successfully call. Therefore, knowing that an object was checked out from, for example, an FTP site or other document manager, a special DLL would be listed in the LibPath1 column 635-13. This DLL would be loaded into memory and functions in it would be called to check the document back in.

FIG. 13 is a schematic diagram of a preferred current metadata table in accordance with the invention. A CURRENT_CDI_METADATA table 640 stores all metadata associated with a given object. It stores the basic attributes, such as name and date created (attributes that all objects have) as well as the custom attributes in their raw form. The data definition object is used to map this raw data into a form that is human-readable.

As illustrated, there are a plurality of attributes in the CURRENT_CDI_METADATA table 640. A CDIObjID 645-1 provides a unique identifier for the object. A CDIVerNum 645-2 provides a version number of the object. A CDIObjType 645-3 is a string which defines the type (i.e., filter, document or external). A CDIObjSubType 645-4 is a stream which defines a custom type (i.e., custom folder for website document). A CheckedOutFlg 645-5 indicates whether the object is checked out or not. A CheckedOutType 645-6 indicates the type of check out (i.e., read only or editable). A CheckedOutUsrID 645-7 indicates the user that has currently checked out the object. A CreationDT 645-8 indicates the date the object was created. A CreatedByUsrID 645-9 indicates the user that originally created the item. An author attribute 645-10 identifies the user that authored the item. A CDIObjName 645-11 provides a human-readable name for the object. A DeletedFlg 645-12 is used to tag the object for deletion. Columns m0, . . . ,mZ 645-13, . . . ,645-z provide custom raw data for storing custom attributes.

FIG. 14 is a schematic diagram of a preferred database table for old metadata in accordance with the invention. As illustrated, an OLD_CDI_METADATA table 650 is analogous to the CURRENT_CDI_METADATA table 640, except that it stores the attribute information for old versions of objects in the system.

FIG. 15 is a schematic diagram of a preferred database table for mapping metadata to column names in accordance with the invention. The METADATA_TO_COLNAMES table 660 maps, for each object type, the type and human-readable title. It is used such that attribute information for all object types can be stored in a single database table. Because all actual metadata is stored as binary data (strings) in the CURRENT_CDI_METADATA table 640, the METADATA_TO_COLNAMES table 660 is used to derive useful meaning from the binary data sets. For example, one record in the CURRENT_CDI_METADATA table 640 may be for a customer folder (which is a user-defined custom type) whereas the next record may be for a website document (which is another user-defined custom type). Although the data for these attributes are physically stored the same way, the attributes for the two records are different. The METADATA_TO_COLNAMES table 660 defines structure and meaning for the different attributes.

As illustrated, there are nine attributes. A CDIObjType 665-1 indicates the object type (folder, document, external). A CDIObjSubType 665-2 indicates a custom object type name. A CDIMetaColName 665-3 provides a metadata column name (i.e., mO 645-13, . . . ,mZ 645-z of FIG. 13). A UserChangeFlg 6654 indicates whether a user can change this attribute. A ColDesc 665-5 provides a long human-readable description of the attribute. A ColType 665-6 indicates the column type (Boolean, date, time, number, decimal, string). A MandatoryFlg 665-7 indicates whether the attribute must be filled in. A UserViewFlg 665-8 indicates whether a user can see the attribute. Finally, a SystemFlg 665-9 indicates whether the attribute is used solely by the system.

FIG. 16 is a schematic diagram of a preferred object type database table in accordance with the invention. An OBJ_TYPE table 670 defines custom object types. A complete definition for a user-defined custom object is made up of the data in this table along with the data in the METADATA_TO_COLNAMES table 660. For specific instance of an object, the data comes from the CURRENT_CDI_METADATA table 640 or the OLD_CDI_METADATA table 650.

As illustrated, there are seven attributes in the OBJ_TYPE table 670. An ObjType 675-1 indicates the basic type of the object (folder, document, external). An ObjSubType 675-2 provides a user-defined name for the sub-type (customer folder, web document, etc.). An ObjDescription 675-3 provides a long description of the object type. A TemplateFileFlg 6754 specifies whether there is a template associated with the object. A TemplateFileName 675-5 specifies a path to the template, if any. An Icon attribute 675-6 identifies an icon to be used for the object. Finally, a SystemFlg 675-7 specifies whether the object is a system type, which is not to be created by the user.

EXAMPLES

Figure 17:
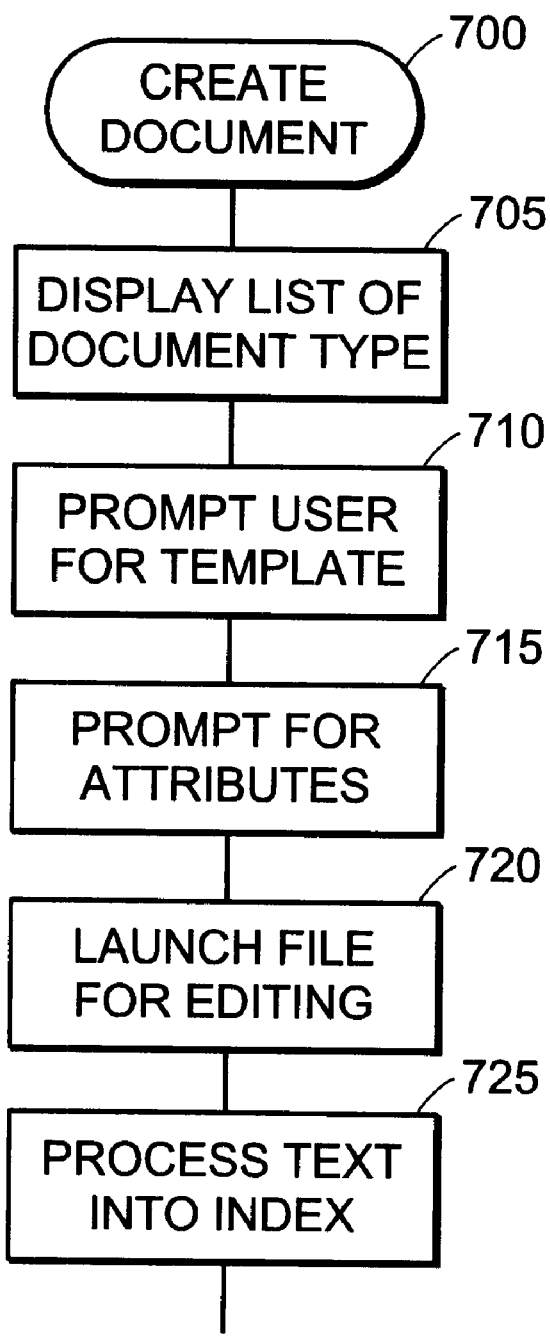
FIG. 17 is a flowchart illustrating the creation of a document in accordance with the preferred embodiment of the invention.

FIG. 17 is a flowchart illustrating the creation of a document in accordance with the preferred embodiment of the invention. A document creation task 700 is performed by a user through the user interface 5. At step 705, the document management subsystem 6 displays a list of custom document types. Specifically, the object definition list is enumerated to get each available object type. This list preferably exists as a linked list connected to the central object 70.

The document types are associated with files in a template directory on the user's hard drive. At step 710, the user is prompted for an actual file or template to associate with this new document object. Optionally, this association can be done at a later time.

The object definition is queried for which attributes exist for the new object. These include custom and standard attributes. At step 720, the user is prompted to enter the standard attributes and any custom attributes for this document type.

Once the object is created, this associated file is launched for editing at step 725. The metadata is stored in the ODBC database. The relationship between this document object and parent objects are also stored in the ODBC database.

Information is also stored in a text index for textual-type data. At step 730, the indexer processes the text into the full-text index.

Figure 18A:
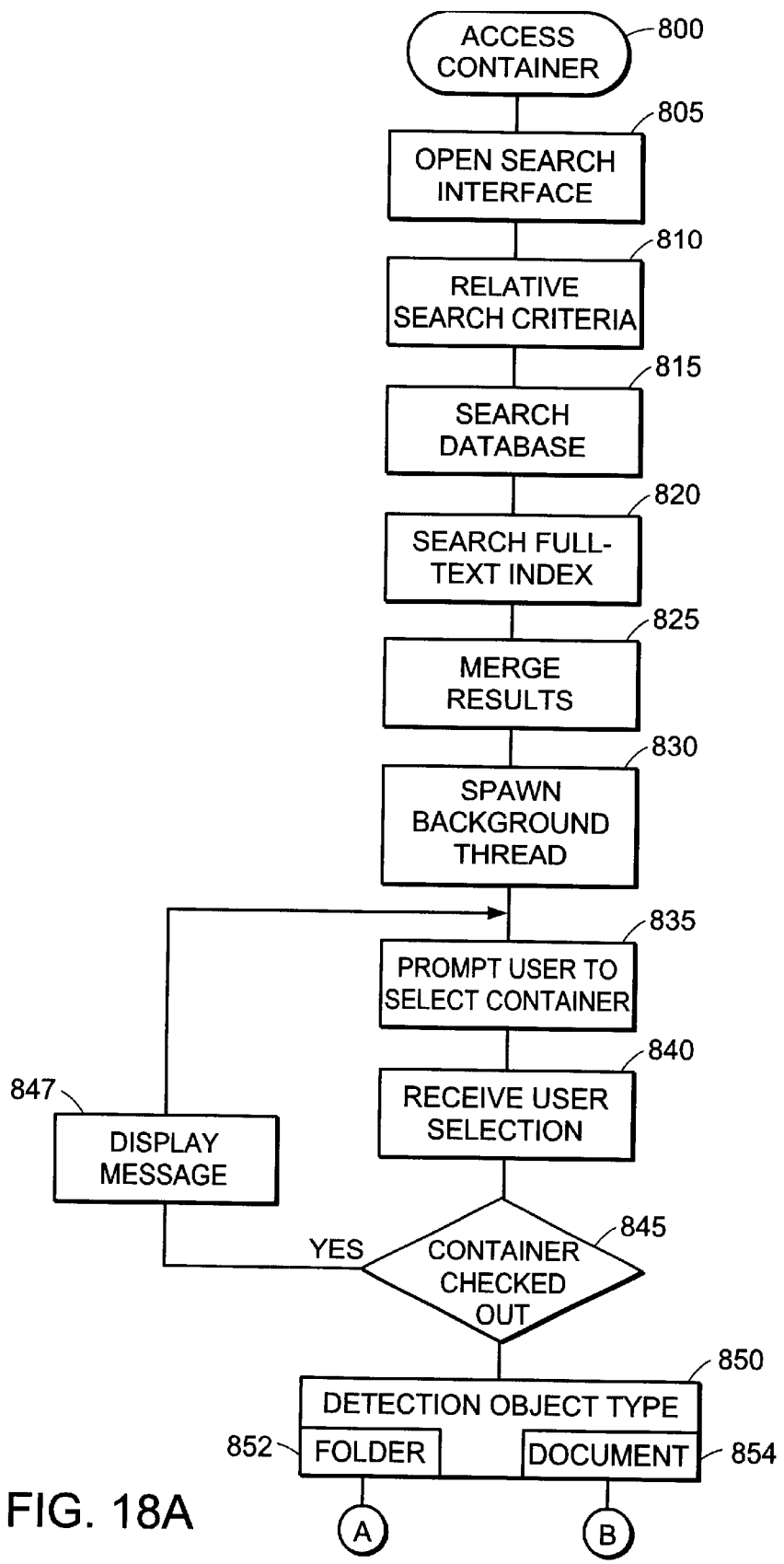
FIGS. 18A–18B is a flowchart illustrating the steps for accessing a container object in accordance with the preferred embodiment of the invention.
Figure 18B:
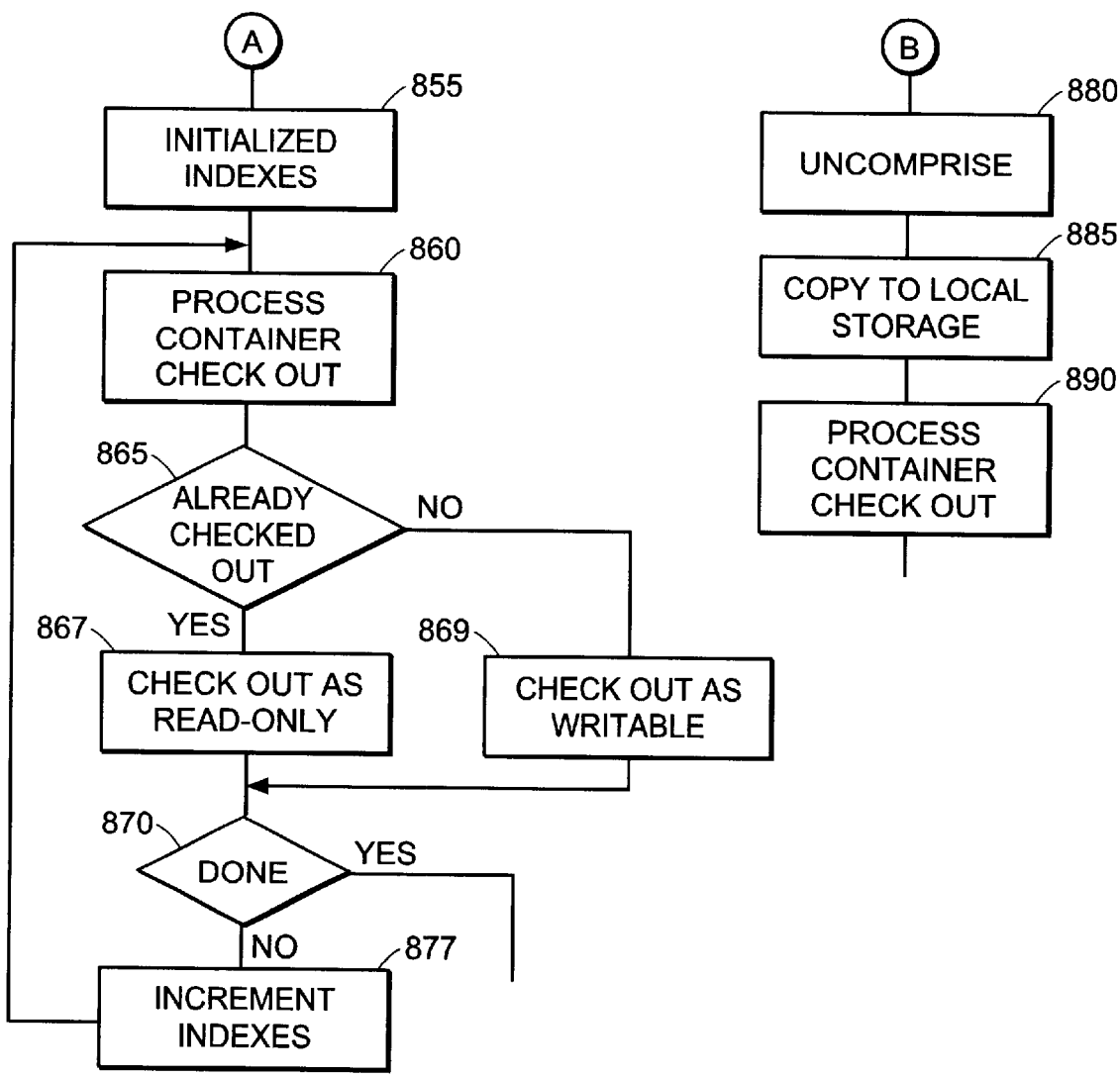

FIGS. 18A–18B is a flowchart illustrating the steps for accessing a container object in accordance with the preferred embodiment of the invention. As illustrated, the user first searches for and checks out a container. At step 805, a search interface is opened for entry of attribute and text search criteria. A global definition object is used to present fields which can be queried by the user.

At step 810, the search engine receives the user's search criteria. One of many database access objects can be used to search the database for objects matching the given criteria. At step 815, the database class accesses one or more tables to gather a first result list of matching containers.

At step 820, a text index class is used to search for all documents that contain any text entered by the user. The results of the full-text search yields a second result list.

At step 825, the results of the database search and text index search are merged to produce one link list of containers. At step 830, a background thread is formed to gather further details for each container hit.

At step 835, a list of the matching containers is presented to the user for a selection. At step 840, the user selects one of the hits to be checked out for editing. At step 845, the container checks to see if it has already been checked out.

If the container has already been checked out to another user, processing returns to step 835 after the displaying a message to the user at step 847. If the container has not already been checked out, processing continues to step 850.

At step 850, the container checks to see what type of object it is so that it can determine the mechanics for processing the check out. The container can either be a folder, document, or external type object that uses an additional DLL to process the check out.

If the object is a folder 852, the folder recurses through its subfolders to request that each container (subfolder or document) check itself out. At step 855, the recursive indexes are initialized. At step 860, the container check out is processed for the current container in a recursion. At step 865, the container checks to see if it is already checked out.

If already checked out, processing continues to step 867 wherein the user receives a read-only check out of the container. If a document or subfolder is already checked out, the user may edit higher branches of the checked out folder, but not the viewed only branch. If the container has not already been checked out, processing continues to step 869 where the user receives a writable check out. In either case, processing then continues to step 870. At step 870, a check is done to see if the recursion is completed, if not, then processing returns to step 860 after implementing the recursion indexes at step 877.

If the object is a document 854, processing continues to step 880 where the document is uncompressed. At step 885, the uncompressed document is copied to local storage. At step 890, the container processes its check out code for right access to make sure that no one else can check out the document.

EQUIVALENTS

While the invention has been particularly shown and described with reference to preferred embodiments thereof, it will be understood by those skilled in the art that various changes in form and detail can be made without departing from the spirit and scope of the invention as defined by the appended claims. For example, although the invention has been described with reference to particular hardware and software embodiments, it will be understood that there are aspects of the invention which can be embodied in either hardware, software, or firmware.

These and all other equivalents are intended to be encompassed by the following claims.

The invention claimed is:

1. A computer-implemented method for managing a plurality of documents stored in a file system, each document having a plurality of document attributes and a content, the method comprising:

storing the document attributes and the content of a managed document in a document database, the storing of document attributes including maintaining an index of a plurality of managed documents and storing configuration relationships between a plurality of managed documents;

storing searchable text derived from the content of the managed files in an indexed database;

coupling a manager subsystem, configurable in an object-oriented architecture to the document database and the index database;

from the manager subsystem, effecting changes to the managed document by modifying the document database;

from the manager, synchronizing the index database and the file system with the modified document database;

from the manager, instantiating a plurality of base objects from a plurality of dynamic document definitions, the relationships between the base objects being defined by information stored in the document database, the base objects representing a subsection of the documents; and from the manager, upon request, displaying contents of a document having a file format in the file system chosen from a plurality of supported file formats;

wherein the stored document attributes are dynamically customizable and include an ordered sequence between a plurality of sibling managed documents.

* * * * *